(12) United States Patent
Inazuka et al.

(10) Patent No.: US 6,813,444 B2
(45) Date of Patent: Nov. 2, 2004

(54) CAMERA HAVING AN OPENABLE LENS COVER

(75) Inventors: Masahiro Inazuka, Saitama (JP); Kiyoshi Kawano, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/372,327

(22) Filed: Feb. 25, 2003

(65) Prior Publication Data

US 2003/0165337 A1 Sep. 4, 2003

(30) Foreign Application Priority Data

Mar. 1, 2002 (JP) ........................................ 2002-056025

(51) Int. Cl.⁷ ............................................ G03B 17/00
(52) U.S. Cl. ........................ 396/267; 396/284; 396/448
(58) Field of Search ................................. 396/267, 281, 396/282, 284–295, 376, 448

(56) References Cited

U.S. PATENT DOCUMENTS

| 4,106,037 A | * | 8/1978 | Nakamura et al. | .......... 396/178 |
| 5,794,084 A | * | 8/1998 | Ikari | .......................... 396/178 |
| 6,704,506 B2 | * | 3/2004 | Sasagawa | .................... 396/448 |

* cited by examiner

*Primary Examiner*—David M. Gray
(74) *Attorney, Agent, or Firm*—Greenblum & Bernstein, P.L.C.

(57) ABSTRACT

A camera includes a camera body having a photographing lens, a lens cover plate which is supported on the camera body so that said lens cover plate moves between a closed position at which the lens cover plate covers the front of the photographing lens and an open position at which the lens cover plate uncovers the front of the photographing lens, and a light emitting device, wherein at least one element of the light emitting device is positioned on the lens cover plate.

23 Claims, 18 Drawing Sheets

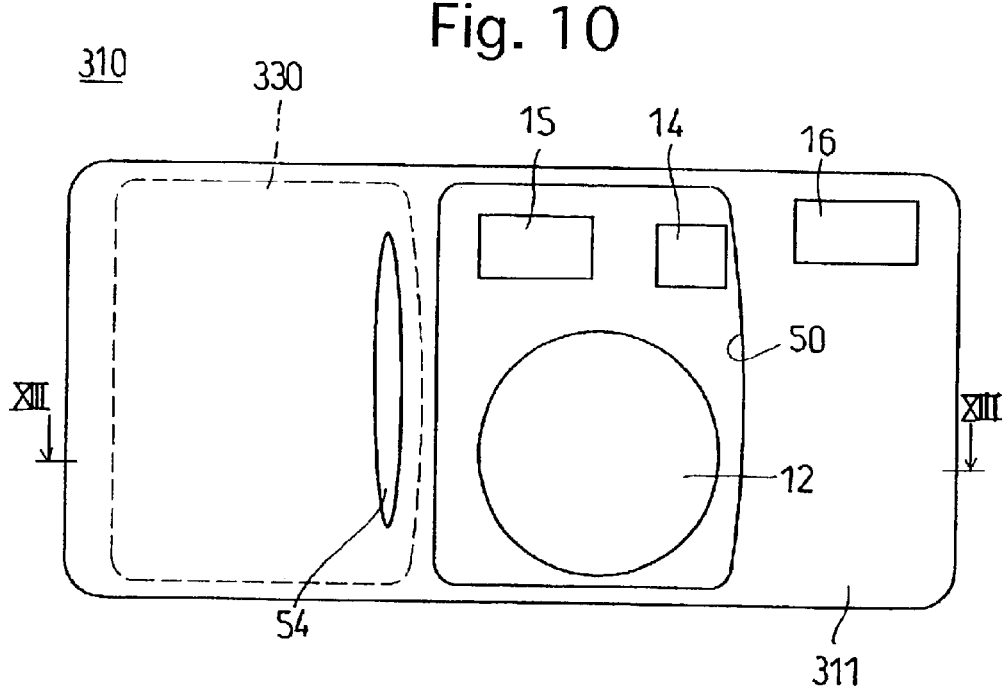
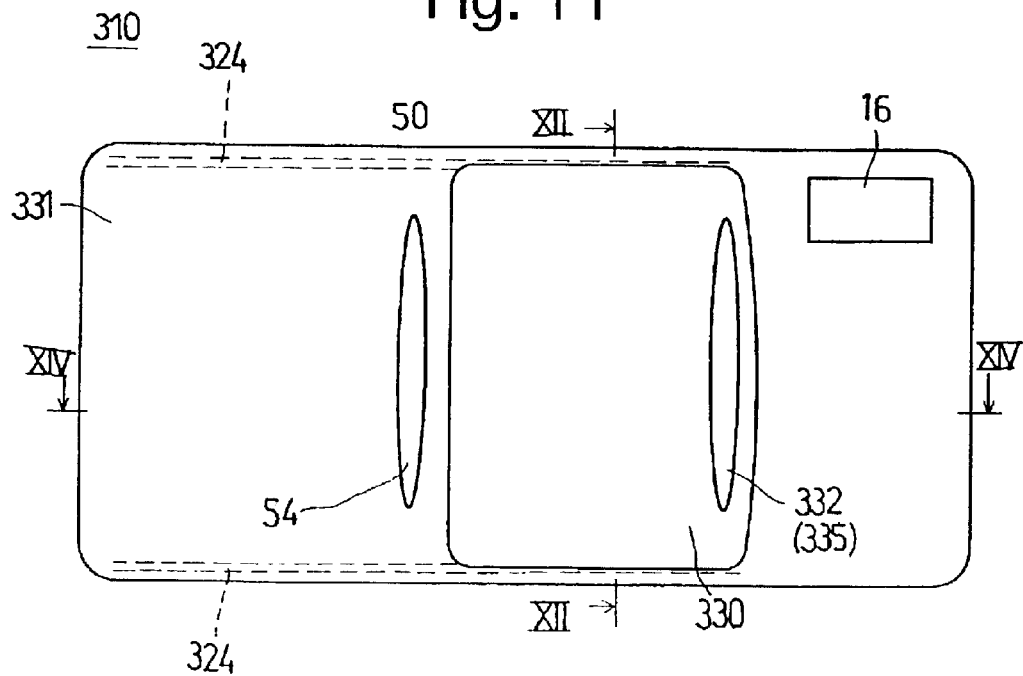

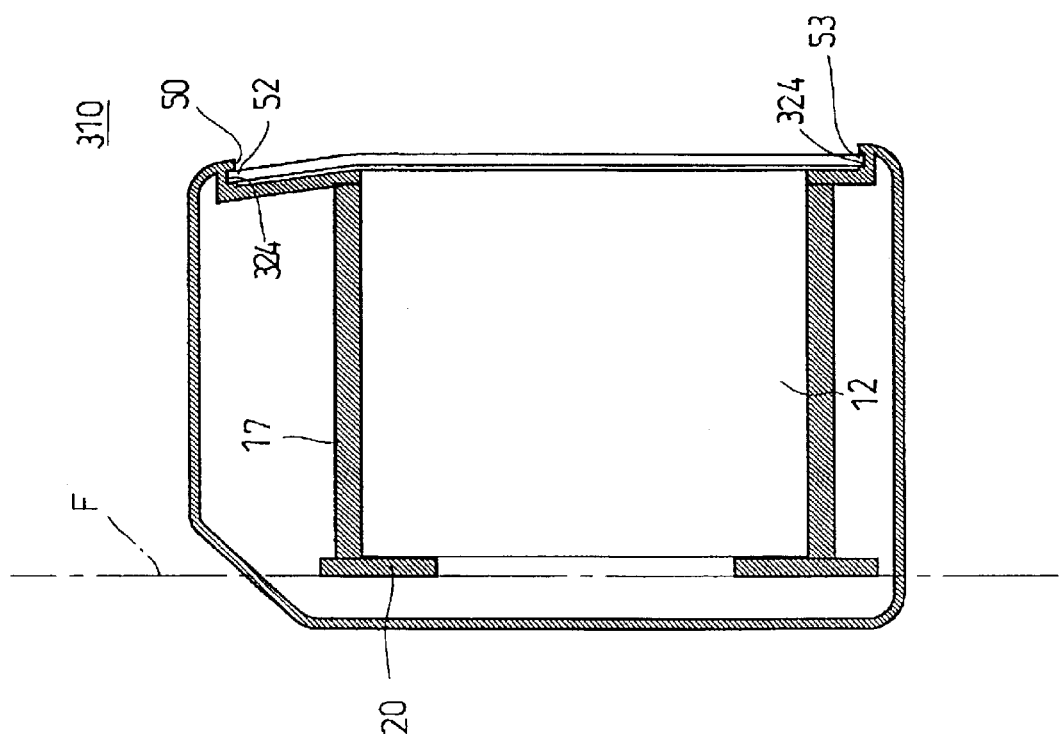

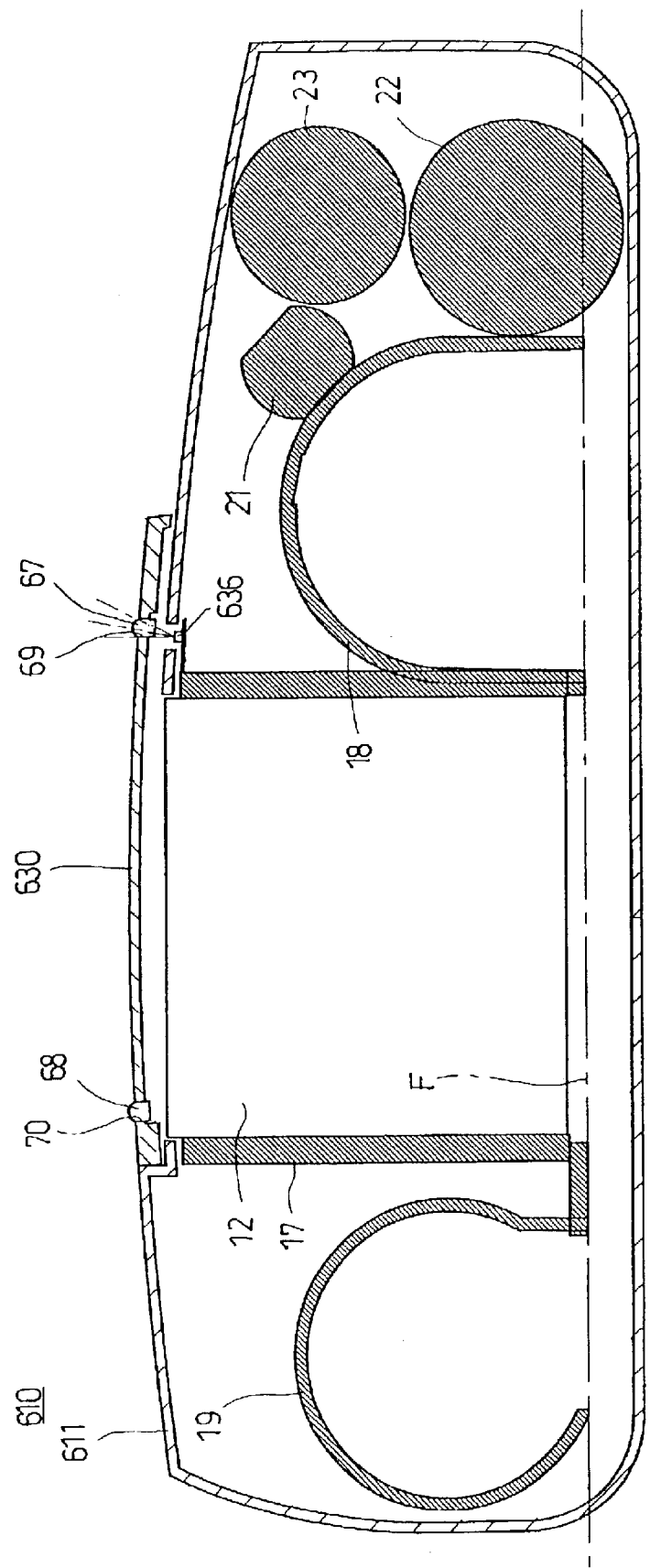

CAMERA HAVING AN OPENABLE LENS COVER

BACKGROUND OF THE INVENTION

1. Field of the Invention

The present invention relates to a camera having an openable lens cover on a body of the camera. The lens cover can be closed and opened to cover and uncover the front of the photographing lens of the camera, respectively.

2. Description of the Related Art

Cameras of recent years are often provided on the front of the camera body with a light-emitting indicator (using a light emitter such as an LED) which serves as an information indicator such as a self-timer status indicator or an in-focus-state indicator. If this type camera is provided on front thereof with a lens cover plate (lens barrier), which is closed and opened to cover and uncover the front of the photographing lens (lens barrel) of the camera wherein the range of movement of the lens cover plate is large, the degree of freedom in location and shape of the aforementioned light-emitting indicator is limited.

SUMMARY OF THE INVENTION

The present invention provides a camera having an openable lens cover plate which has a high degree of design freedom in location and shape of the light-emitting indicator is achieved.

According to an aspect of the present invention, a camera is provided, including a camera body having a photographing lens; a lens cover plate which is supported on the camera body so that the lens cover plate moves between a closed position at which the lens cover plate covers the front of the photographing lens and an open position at which the lens cover plate uncovers the front of the photographing lens; and a light emitting device, wherein at least one element of the light emitting device is positioned on the lens cover plate.

The light emitting device can serve an indicator for indicating information on the camera by light emission.

The light emitting device can include a light source positioned in a through-hole formed on the lens cover plate, and a transparent member positioned in front of the light source.

It is desirable for the light emitting device to further include a light-source controller, provided in the camera body, for controlling light emission of the light source; and a flexible printed wiring board which connects the light source with the light-source controller, and is flexed by a movement of the light source when the lens cover plate moves between the closed position and the open position.

The flexible printed wiring board can include two straight portions extending substantially parallel to a direction of movement of the lens cover plate; and a U-shaped portion which connects the two straight portions. The camera further includes a biasing device which pulls the U-shaped portion in a direction parallel to the direction of movement of the lens cover plate to remove slack in the flexible printed wiring board.

The U-shaped portion can be positioned inside the camera body.

The lens cover plate can be supported by the camera body to be positioned outside thereof, and the U-shaped portion is positioned in a space between the lens cover plate and the camera body.

Alternatively, the lens cover plate can be supported by the camera body to be positioned outside thereof, and a front wall of the camera body can be provided with a through-hole via which the flexible printed wiring board is drawn into the camera body from outside the camera body. The through-hole is formed on a portion of the camera body which remains covered by the lens cover plate when the lens cover plate is in the closed position and when the lens cover plate is in the open position.

The lens cover plate can be supported by the camera body to be positioned outside thereof. A front wall of the camera body can be provided with a through-hole via which the flexible printed wiring board is drawn into the camera body from outside the camera body. The through-hole can be formed on a portion of the camera body which remains covered by the lens cover plate when the lens cover plate is in the closed position and when the lens cover plate is in the open position. The flexible printed wiring board can further include a third straight portion extending substantially parallel to the two straight portions, the third straight portion being positioned on an opposite side of the front wall of the camera body with respect to the two straight portions; and a second U-shaped portion which connects the third straight portion with one of the two straight portions, the second U-shaped portion being positioned in the through-hole.

The lens cover plate can be supported by the camera body to be positioned inside the camera body, the light source and the transparent member, which is positioned in front of the light source, can be fixed to the lens cover plate, and the transparent member is covered by the camera body when the lens cover plate is positioned in at least one of the open position and the closed position. The camera body can include a transparent portion which is positioned in front of the transparent member when the lens cover plate is positioned in at least one of the open position and the closed position.

The transparent member, which is fixed to the lens cover plate, can be covered by the camera body when the lens cover plate is positioned in the open position, and the transparent portion of the camera body includes a through-hole formed at a position on the camera body which faces the transparent member when the lens cover plate is in the open position, and wherein a second transparent member fitted in the through-hole.

It is desirable for the transparent member, which is fixed to the lens cover plate, to remain covered by the camera body when the lens cover plate is positioned in one of the open position and the closed position. The transparent portion of the camera body includes a through-hole which ranges to correspond to a range of movement of the transparent member, and a second transparent member fitted in the through-hole.

The lens cover plate can be supported on the camera body to be positioned on the outside thereof. The light emitting device can include a light source formed at a position on the camera body which is covered by the lens cover plate when the lens cover plate is positioned in at least one of the open position and the closed position; and a transparent portion formed on the lens cover plate to allow light emitted from the light source to pass through the transparent portion.

The light source can be formed on a portion of the camera body which remains covered by the lens cover plate when the lens cover plate is in the closed position and when the lens cover plate is in the open position, and the transparent portion of the lens cover plate allows the light emitted from the light source to pass through the transparent portion when the lens cover plate is positioned in one of the open position and the closed position.

The transparent portion of the lens cover plate can include a through-hole formed on the lens cover plate to be positioned in front of the light source when the lens cover plate is positioned in one of the open position and the closed position; and a light guide which includes a light exit portion fitted in the through-hole and a light guide portion, the light guide guiding light emitted from the light source to the light exit portion via the light guide portion when the lens cover plate is positioned in the other of the open position and the closed position.

The transparent portion of the lens cover plate can include two through-holes formed on the lens cover plate, one and the other of the two through-holes being positioned in front of the light source when the lens cover plate is positioned in the open position and the closed position, respectively; and two transparent members fitted in the two through-holes, respectively.

The biasing device can be an extension coil spring extending between the U-shaped portion and a stationary portion of the camera body.

The main power of the camera can be turned ON and OFF when the lens cover plate is positioned in the open position and the closed position, respectively.

The transparent member can be fixed to the lens cover plate to project forward from a front surface of the lens cover plate so as to serve as a fingerhold.

The transparent member can be fixed to the lens cover plate to serve as a diffusing lens.

In another embodiment, a camera is provided, including a camera body having a photographing lens; a lens cover plate which is supported by the camera body so that the lens cover plate moves between a closed position at which the lens cover plate covers the front of the photographing lens and an open position at which the lens cover plate uncovers the front of the photographing lens; and a light-emitting indicator including a light source and a transparent member positioned in front of the light source, the light emitting indicator being fixed to the lens cover plate.

In another embodiment, a camera is provided, including a camera body having a photographing lens; a lens cover plate which is supported by the camera body so that the lens cover plate moves between a closed position at which the lens cover plate covers the front of the photographing lens and an open position at which the lens cover plate uncovers the front of the photographing lens; a light source formed at a position on the camera body which is covered by the lens cover plate when the lens cover plate is positioned in at least one of the open position and the closed position; and a transparent portion formed on the lens cover plate to allow light emitted from the light source to pass through the transparent portion.

In another embodiment, a camera is provided, including a camera body having a photographing lens, a lens cover plate which is supported by the camera body so that the lens cover plate moves between a closed position at which the lens cover plate is positioned in front of the photographing lens and an open position at which the lens cover plate is positioned aside from front of the photographing lens, and a light emitter. The lens cover plate includes a transparent portion through which the light emitter emits light toward front of the camera.

The present disclosure relates to subject matter contained in Japanese Patent Application No. 2002-56025 (filed on Mar. 1, 2002) which is expressly incorporated herein by reference in its entirety.

BRIEF DESCRIPTION OF THE DRAWINGS

The present invention will be described below in detail with reference to the accompanying drawings in which:

FIG. 10 is a front elevational view of a fourth embodiment of the camera according to the present invention, illustrating the camera in a state where the lens cover plate of the camera is fully opened;

FIG. 11 is a view similar to that of FIG. 10 and illustrates the camera in a state where the lens cover plate is fully closed;

FIG. 12 is a cross sectional view taken along XII—XII line in FIG. 11;

FIG. 20 is a view similar to that of FIG. 19 and illustrates the camera in a state where the lens cover plate is fully closed.

DESCRIPTION OF THE PREFERRED EMBODIMENTS

Figure 1:
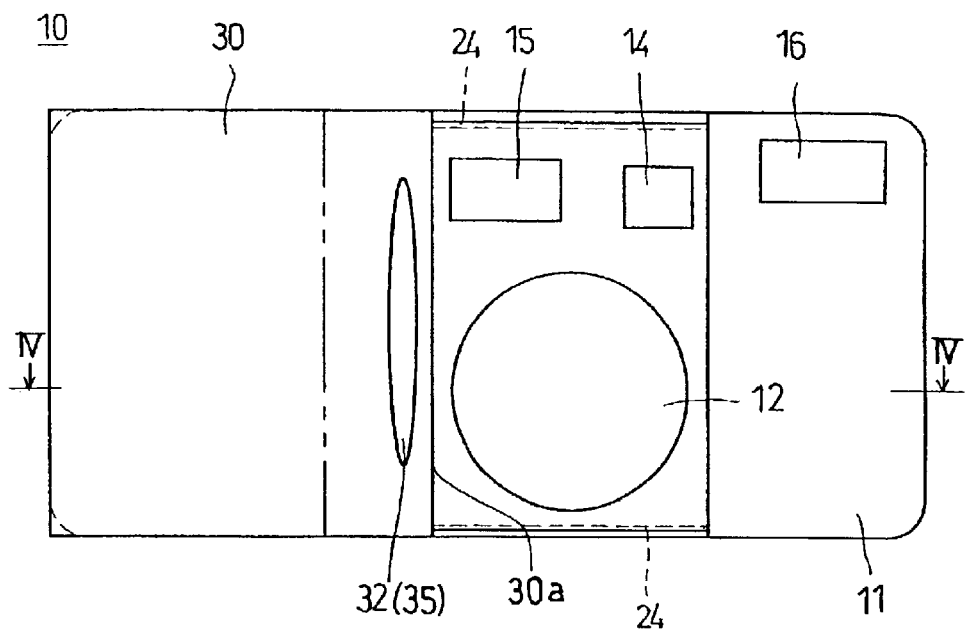
FIG. 1 is a front elevational view of a first embodiment of a camera according to the present invention, illustrating the camera in a state where a lens cover plate of the camera is fully opened.
Figure 2:
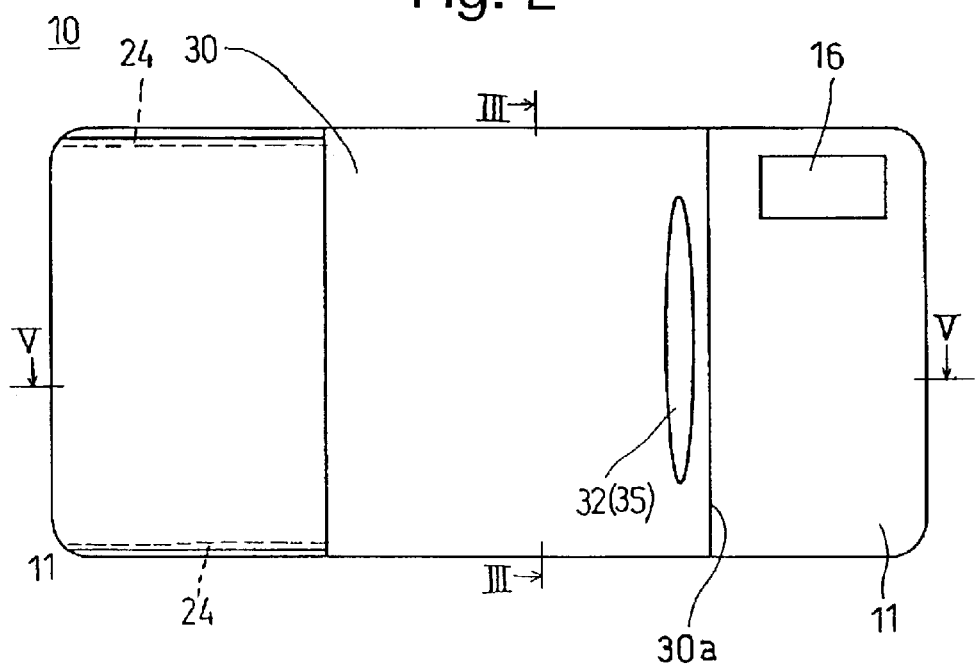
FIG. 2 is a view similar to that of FIG. 1 and illustrates the camera in a state where the lens cover plate is fully closed.

FIGS. 1 through 5 show a first embodiment of a camera 10 according to the present invention. The camera 10 is provided on front of a camera body 11 at a substantially central position with a lens barrel 12 which incorporates a photographing lens system. The camera 10 is provided, on front of the camera body 11 above the lens barrel 12, with a viewfinder window 14 through which a photographic view is determined by a user of the camera 10, and a photographing-condition measuring window 15 through which several photographing conditions such as an object brightness and an object distance are measured. The camera 10 is further provided on front of the camera body 11 with a strobe window 16.

Figure 3:
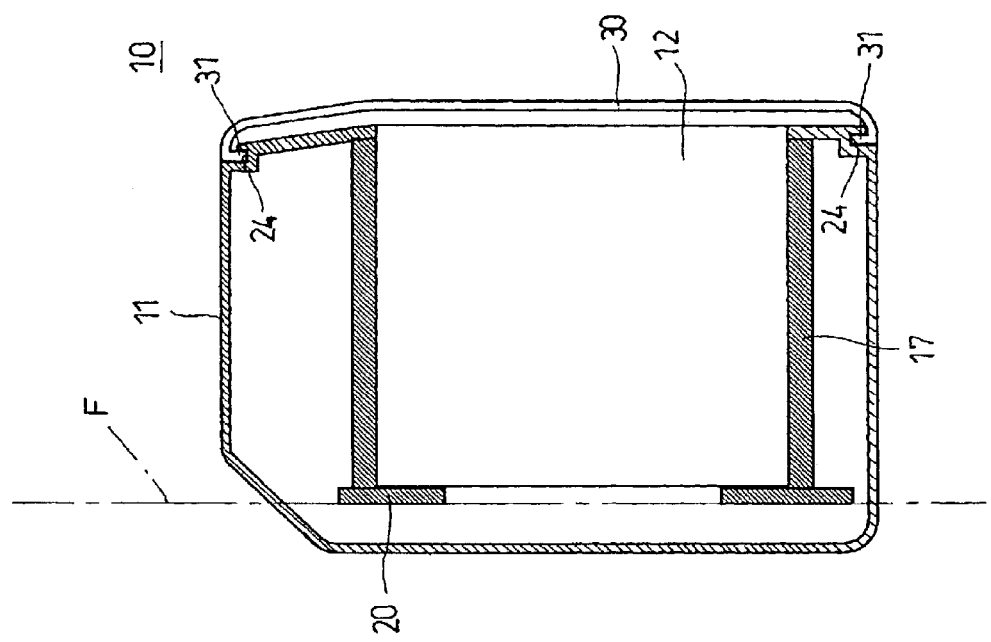
FIG. 3 is a cross sectional view taken along III—III line in FIG. 2.
Figure 4:
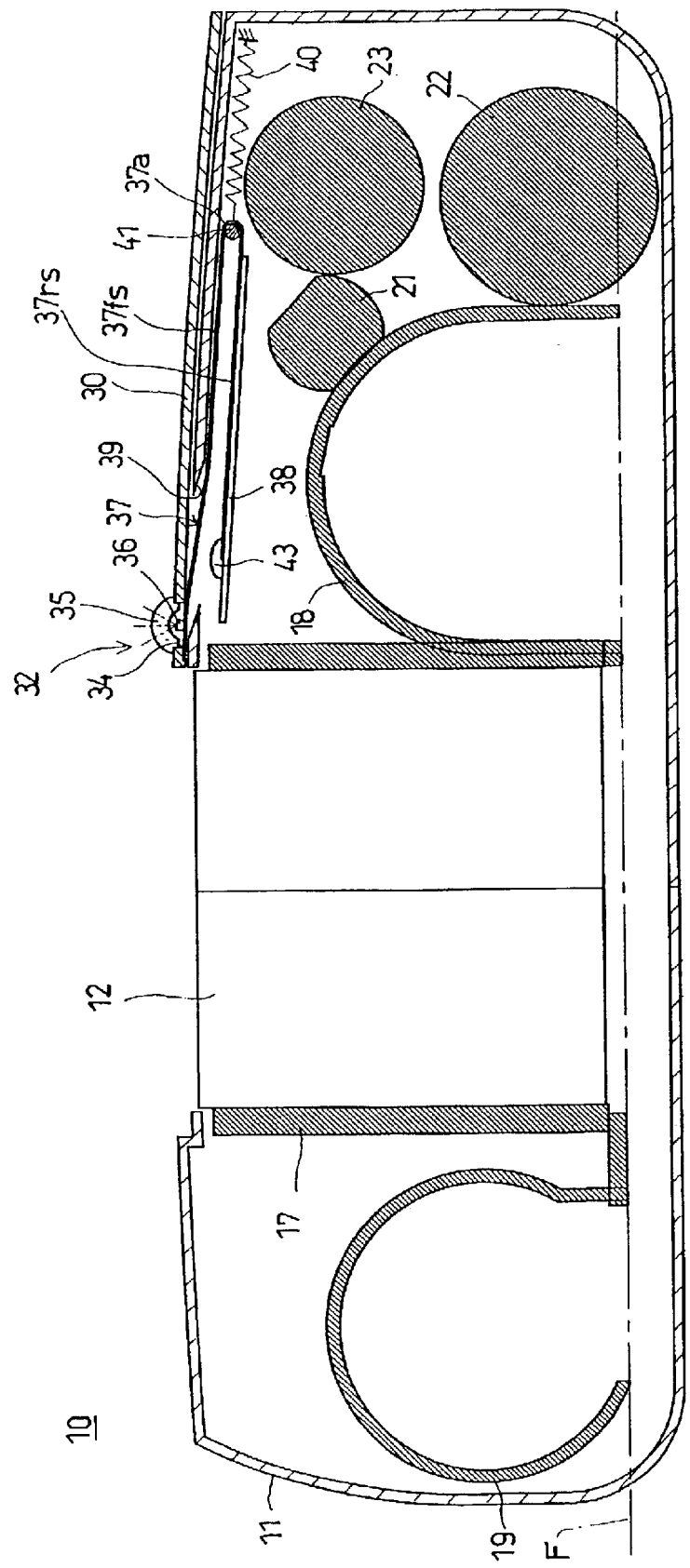
FIG. 4 is a cross sectional view taken along IV—IV line in FIG. 1.
Figure 5:
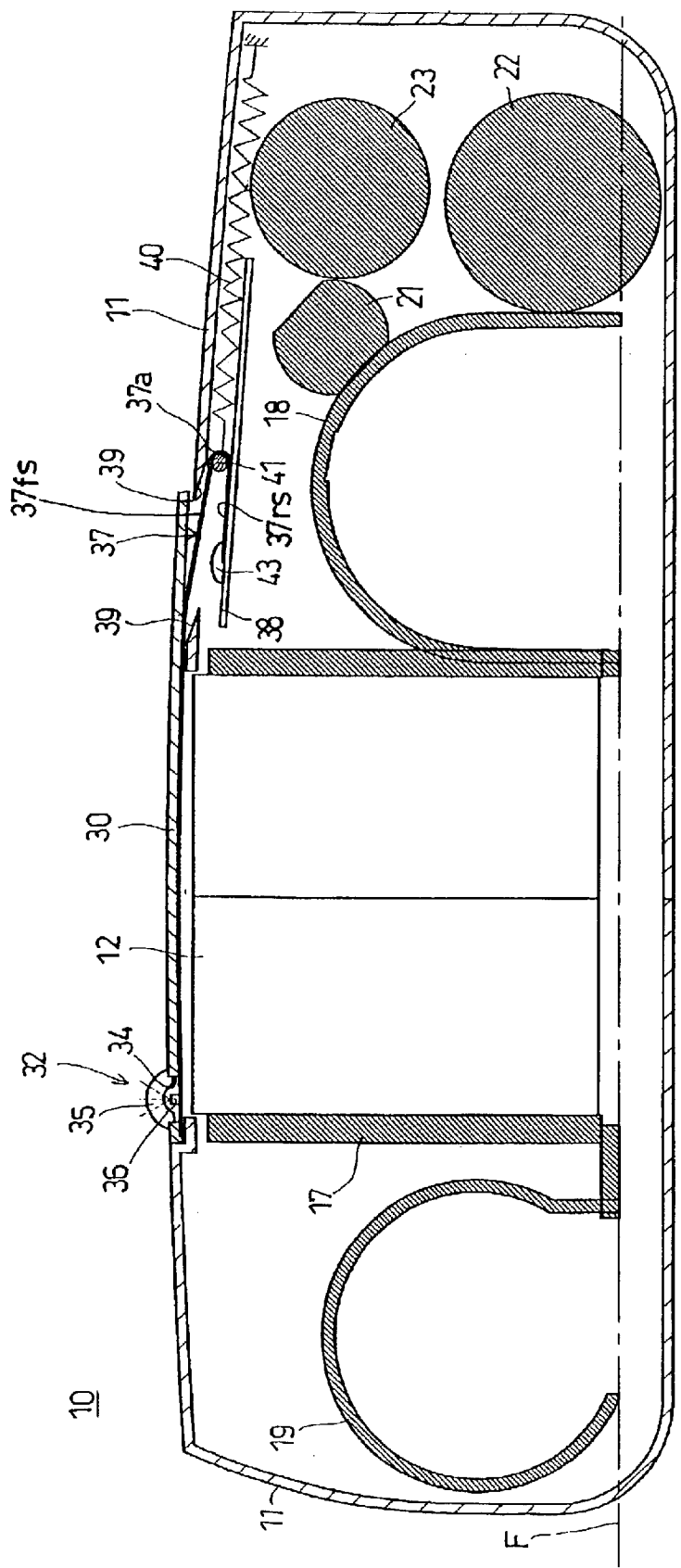
FIG. 5 is a cross sectional view taken along V—V line in FIG. 2.

The camera 10 is provided therein with a lens barrel accommodation portion 17, and is further provided on respective sides (right and left sides as viewed in FIG. 4) of the lens barrel accommodation portion 17 with a film cartridge chamber 18 and a take-up spool chamber 19. The camera body 11 is provided behind the lens barrel accommodation portion 17 with an aperture frame 20, which has a rectangular aperture for forming the limits of each frame exposed. Film (not shown) drawn out of a film cartridge (not shown) accommodated in the film cartridge chamber 18 passes a film path immediately behind the aperture frame 20 to be wound on a take-up spool (not shown) provided in the take-up spool chamber 19. A one-dot chain line F shown in FIGS. 3 through 5 represents the position of a film surface immediately behind the aperture frame 20. As shown in FIGS. 4 and 5, the camera 11 is provided in the camera body 11 in the vicinity of the film cartridge chamber 18 with a film winding motor 21, a battery 22 and a main condenser 23.

The camera 10 is provided on front thereof with a manually-slidable lens cover plate (lens barrier) 30. The camera body 11 is provided on the front surface on upper and lower portions thereof with a pair of guide recesses 24, respectively, which extend parallel to each other in the horizontal direction (right and left direction) of the camera body 10. The lens cover plate 30 is provided on upper and lower edges thereof with a corresponding pair of guide projections 31 which are engaged in the pair of guide recesses 24, respectively. Accordingly, the lens cover plate 30 is supported by the camera body 11 to be slidable thereon in the horizontal direction of the camera body 11 by engagement of the pair of guide recesses 24 with the pair of guide projections 31. The lens cover plate 30 is movable between a fully-open position shown in FIG. 1 in which the front of the lens barrel 12, the viewfinder window 14 and the photographing-condition measuring window 15 are exposed to the front of the camera 10, and a fully-closed position shown in FIG. 2 in which the lens cover plate 30 lies in front of the lens barrel 12, the viewfinder window 14 and the photographing-condition measuring window 15 are covered by the lens cover plate 30.

The lens cover plate 30 is provided in the vicinity of an inner edge (a right edge as viewed in each of FIGS. 1 and 2) 30a thereof with a light-emitting indicator 32 which indicates specific information on the camera 10 by light emission. As shown in FIGS. 4 and 5, the light-emitting indicator 32 is provided with an LED 36 and a transparent covering member 35 positioned in front of the LED 36. The transparent covering member 35 is fixed to the lens cover plate 30 to cover a through-hole 34 which is formed on the lens cover plate 30 to penetrate the lens cover plate 30, while the LED 36 is positioned in the through-hole 34 behind the transparent covering member 35. The transparent covering member 35 is formed to serve as a diffusing lens through which the light emitted from the LED is projected as diffused light toward the front of the camera 10.

The camera 10 is provided in the camera body 11 with a lighting-control circuit board (light-source controller) 38, while the LED 36 is electrically connected to the lighting-control circuit board 38 via a flexible PWB (printed wiring board) 37 which extends behind a rear surface of the lens cover plate 30. A front wall of the camera body 11 is provided with a body through-hole 39 through which the flexible PWB 37 is drawn into the camera body 11 from front of the camera body 11. The flexible PWB 37 is in the shape of a long strip. The flexible PWB 37 is fixed at one end thereof to a rear surface of the lens cover plate 30, and extends substantially along the rear surface of the lens cover plate 30 in a direction away from the LED 36 to enter into the camera body 11 through the body through-hole 39. Subsequently, the flexible PWB 37 is bent in a U-shape in the camera body 11 to extend linearly in a direction approaching the LED 36, and is fixed at the other end of the flexible PWB 37 to the lighting-control circuit board 38 at a soldered portion 43 thereon. The camera 10 is provided in the camera body 11 with an extension coil spring (biasing device) 40 which pulls a U-shaped portion 37a of the flexible PWB 37 in a direction away from the LED 36. One end of the extension coil spring 40 is fixed to an inner stationary portion of the camera body 11 while the other end of the extension coil spring 40 is fixed to a roller 41 around which the U-shaped portion 37a is wound.

Therefore, the flexible PWB 37 changes the position of the U-shaped portion 37a by tensile force of the extension coil spring 40 when the LED 36 changes the position thereof in accordance with opening and closing movement of the lens cover plate 30. At this time, the ratio of the length of a front straight portion 37fs of the flexible PWB 37 in front of the roller 41 (which extends from the one end of the flexible PWB 37 to which the LED 36 is fixed to the U-shaped portion 37a) to the length of a rear straight portion 37rs of the flexible PWB 37 behind the roller 41 (which extends from the U-shaped portion 37a to the other end of the flexible PWB 37 which is fixed at the soldered portion 43) varies to keep the tension of the flexible PWB 37 constant to thereby remove slack in the flexible PWB 37. Specifically, when the lens cover plate 30 is in the fully-closed position as shown in FIG. 5, the one end of the flexible PWB 37 to which the LED 36 is fixed and the other end of the flexible PWB 37 which is fixed at the soldered portion 43 are widely apart from each other, and at the same time, the front straight portion 37fs of the flexible PWB 37 in front of the roller 41 is much longer than the rear straight portion 37rs of the flexible PWB 37 behind the roller 41. On the other hand, when the lens cover plate 30 is in the fully-open position as shown in FIG. 4, the flexible PWB 37 is superfluously long to connect the LED 36 with the soldered portion 43 because the LED 36 and the soldered portion 43 are brought close to each other. However, the U-shaped portion 37a of the flexible PWB 37 is normally pulled in a rightward direction as viewed in FIG. 4 (i.e., in a direction away from the LED 36) to maintain the respective lengths of the front straight portion 37fs and the rear straight portion 37rs at predetermined lengths. Consequently, the flexible PWB 37 is appropriately accommodated in the camera body 11 without allowing slack in the flexible PWB 37 when the lens cover plate 30 is in the fully-open position as shown in FIG. 4. It can be understood from the above descriptions that the U-shaped portion 37a is not a fixed portion but rather varies in accordance with deformation of the flexible PWB 37.

As can be seen in FIGS. 4 and 5, the body through-hole 39 is formed on that portion of the front wall of the camera body 11 which remains covered by the lens cover plate 30 whether the lens cover plate 30 is in the fully-closed position or the fully-open position. Accordingly, the body through-hole 39 is never exposed to the front of the camera 10.

As can be seen in FIGS. 4 and 5, the angle of insertion of the flexible PWB 37 into the body through-hole 39 is inclined to the direction of opening/closing movement of the lens cover plate 30 since the front straight portion 37fs of the flexible PWB 37, which extends from the one end of the flexible PWB 37 to which the LED 36 is fixed to the U-shaped portion 37a, extends along the lens cover plate 30 and subsequently along an inner surface of the camera body 11, i.e., extends along two different planes located at different positions (front and rear positions) in a front/rear direction (i.e., optical axis direction) of the camera 10. Accordingly, the body through-hole 39 is formed so that a cross section thereof as shown in FIGS. 4 or 5 is inclined to the front wall of the camera body 11 to correspond to the direction of insertion of the flexible PWB 37 into the body through-hole 39.

Due to the above described structure, the camera 10 can indicate specific information via the light-emitting indicator 32 provided on the lens cover plate 30 regardless whether the lens cover plate 30 is in the fully-closed position or the fully-open position. This structure does not limit the degree of freedom in location and shape of the light-emitting indicator 32 even in the case of adopting a wide lens-cover plate which is closed and opened to cover and uncover the front of the photographing lens of the camera wherein the range of movement of the lens cover plate is large, and is therefore advantageous with respect to designing the outward appearance of the camera 10. The light-emitting indicator 32 can be used to serve as any type of indicator such as a self-timer status indicator or an in-focus-state indicator.

As can be seen in FIGS. 4 and 5, since the transparent covering member 35 of the light-emitting indicator 32 projects forward from the front surface of the lens cover plate 30, the transparent covering member 35 also serves as a fingerhold, which is held by a finger or fingers of a user when he or she manually opens and closes the lens cover plate 30.

Figure 6:
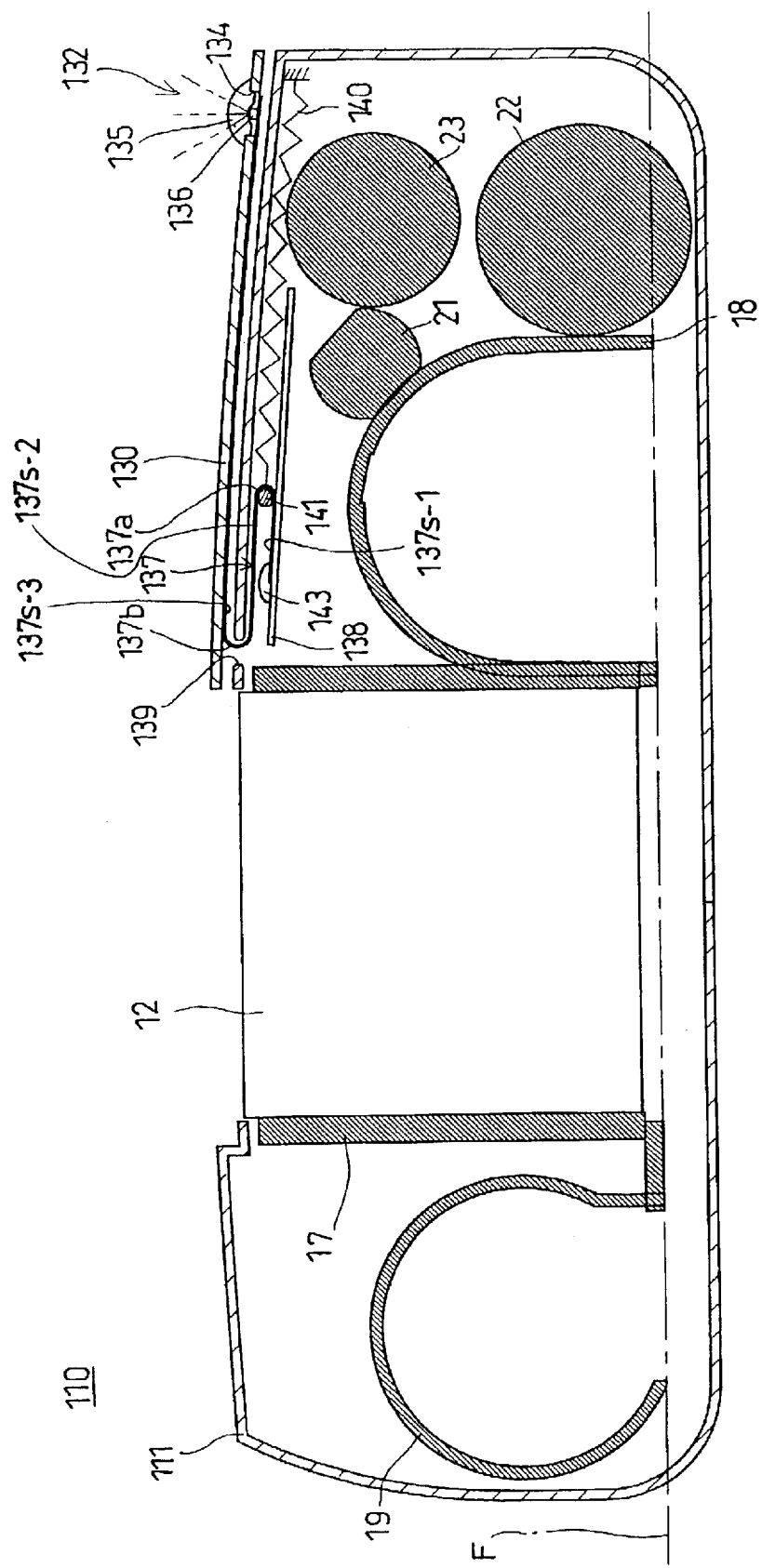
FIG. 6 is a cross sectional view of a second embodiment of the camera according to the present invention, illustrating the camera in a state where the lens cover plate is fully opened.
Figure 7:
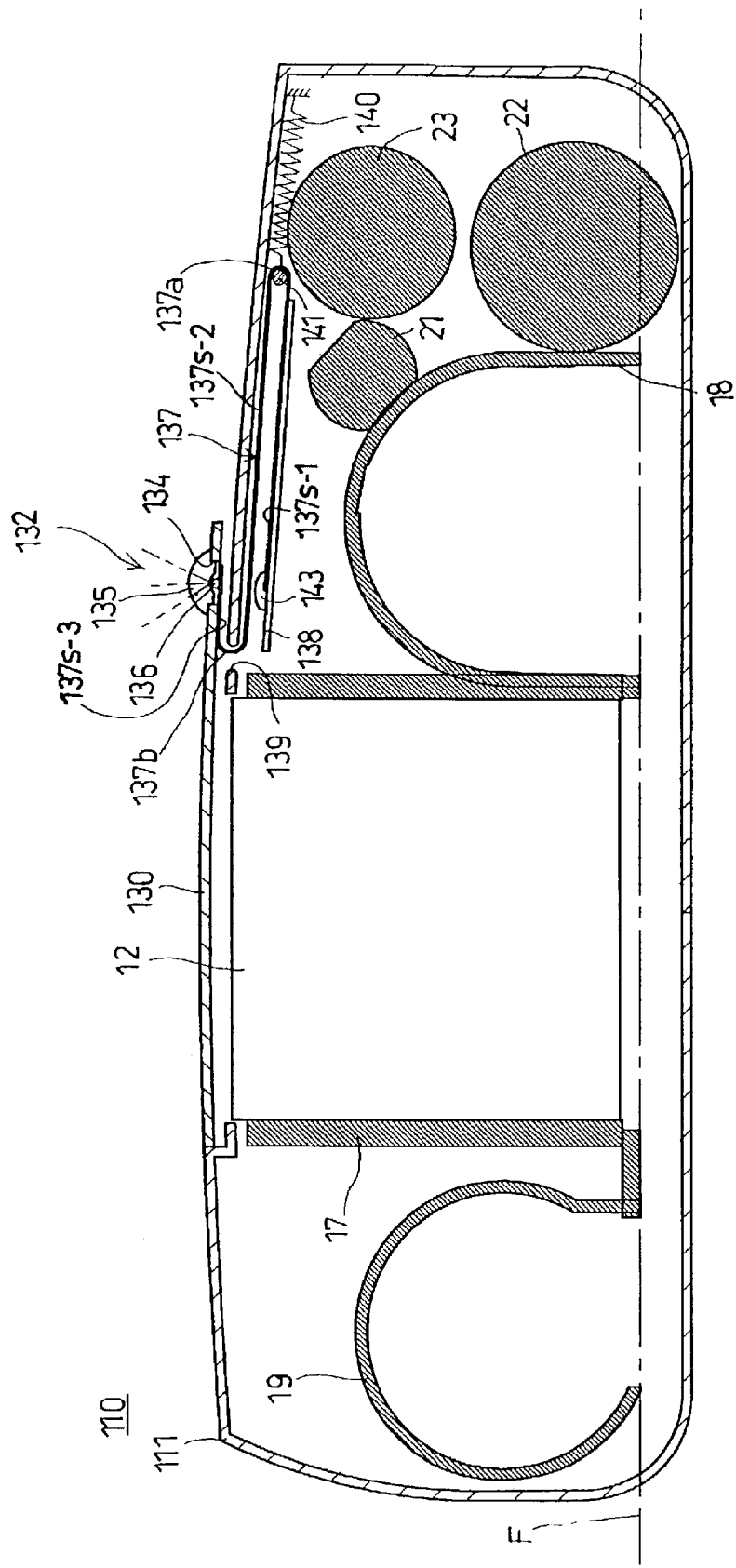
FIG. 7 is a view similar to that of FIG. 6 and illustrates the camera in a state where the lens cover plate is fully closed.

FIGS. 6 and 7 show the second embodiment of a camera 110 according to the present invention. In each of the following embodiments (second through seventh embodiments), elements or portions of the camera which are substantially the same as those in the above described first embodiment of the camera are designated by the same reference numerals. The second embodiment of the camera 110 is provided on front thereof with a manually-slidable lens cover plate 130, which corresponds to the lens cover plate 30 of the first embodiment of the camera 10. The lens cover plate 130 is provided in the vicinity of an outer edge (a right edge as viewed in each of FIGS. 6 and 7) thereof with a light-emitting indicator 132, which corresponds to the light-emitting indicator 32 of the first embodiment of the camera 10. Accordingly, the position of the light-emitting indicator 132 on the lens cover plate 130 in the second embodiment of the camera 110 is different from the position of the light-emitting indicator 32 on the lens cover plate 30 in the first embodiment of the camera 10. The structure of the light-emitting indicator 132 is substantially the same as the structure of the light-emitting indicator 32 of the first embodiment of the camera 10 except for the difference in the fixing position thereof on the lens cover plate. The light-emitting indicator 132 is provided with an LED 136 and a transparent covering member 135 positioned in front of the LED 136. The transparent covering member 135 is fixed to the lens cover plate 130 to cover a through-hole 134 which is formed through the lens cover plate 130, and the LED 136 is positioned in the through-hole 134 behind the transparent covering member 135.

Contrary to the first embodiment of the camera 10, the light-emitting indicator 132 is positioned closest to a soldered portion 143 (which corresponds to the soldered portion 43 of the first embodiment) in the horizontal direction of the camera 110 when the lens cover plate 130 is in the fully-closed position as shown in FIG. 7. The light-emitting indicator 132 gradually moves away from the soldered portion 143 as the lens cover plate 130 is opened. To keep the tension of the flexible PWB 37 constant, a flexible PWB 137, which corresponds to the first embodiment of the flexible PWB 37, is provided with two U-shaped portions, i.e., front and rear U-shaped portions 137b and 137a. A front wall of a camera body 111 of the camera 110 is provided in the vicinity of the lens barrel 12 with a body through-hole 139 through which the flexible PWB 137 is drawn into the camera body 111 from front of the camera body 111. The front U-shaped portion 137b is positioned in the body through-hole 139. Namely, the flexible PWB 137, which extends from the LED 136 toward the center of the camera 110 (i.e., toward the lens barrel 12), is inserted into the body through-hole 139 to be folded back thereat to extend in a direction away from the lens barrel 12. Similar to the U-shaped portion 37a of the first embodiment of the camera 10, the rear U-shaped portion 137a is wound around a roller 141 (which corresponds to the roller 41 of the first embodiment of the camera 10) which is normally pulled in a direction away from the lens barrel 12 via an extension coil spring (biasing device) 140, which corresponds to the extension coil spring 40 of the first embodiment of the camera 10). In regard to the rear U-shaped portion 137a, a portion of the flexible PWB 137 which extends from the front U-shaped portion 137b in a direction away from the lens barrel 12 along an inner surface of the front wall of the camera body 111 is wound around the roller 141 to be folded back to extend in a direction toward the lens barrel 12 along a lighting-control circuit board (light-source controller) 138 thereon. As can be seen in FIGS. 6 and 7, the body through-hole 139 is formed on the portion of the front wall of the camera body 111 which remains covered by the lens cover plate 130 regardless of whether the lens cover plate 130 is in the fully-closed position or the fully-open position. Accordingly, the body through-hole 139 is never exposed to the front of the camera 110.

In the second embodiment of the camera 110, the flexible PWB 137 changes the ratio among the following three lengths: the length of a first straight portion 137s-1 which extends between the soldered portion 143 and the rear U-shaped portion 137a, the length of a second straight portion 137s-2 which extends between the rear U-shaped portion 137a and the front U-shaped portion 137b, and the length of a third straight portion 137s-3 which extends between the front U-shaped portion 137b and the light-emitting indicator 132 (the LED 136), so that the lens cover plate 130 can be opened and closed while keeping the tension of the flexible PWB 137 constant. Note that each of the first, second and third straight portions (137s-1, 137s-2 and 137s-3) of the flexible PWB 137 extend in directions substantially parallel to each other. The rear U-shaped portion 137a is normally pulled in a direction away from the center of the camera 110, i.e., away from the lens barrel 12 (in a rightward direction as viewed in each of FIGS. 6 and 7) via the extension coil spring 140 and the roller 141 to thereby prevent slack in the flexible PWB 137 from occurring whether the lens cover plate 130 is in the fully-closed position or the fully-open position. Specifically, in the case where the lens cover plate 130 is in the fully-closed position wherein the light-emitting indicator 132 is positioned closest to the soldered portion 143 as shown in FIG. 7, the flexible PWB 137 is prevented from having any slack therein by pulling the rear U-shaped portion 137a via the extension coil spring 140, even though the length of the flexible PWB 137 which is to be accommodated in the camera body 111 becomes long.

Figure 8:
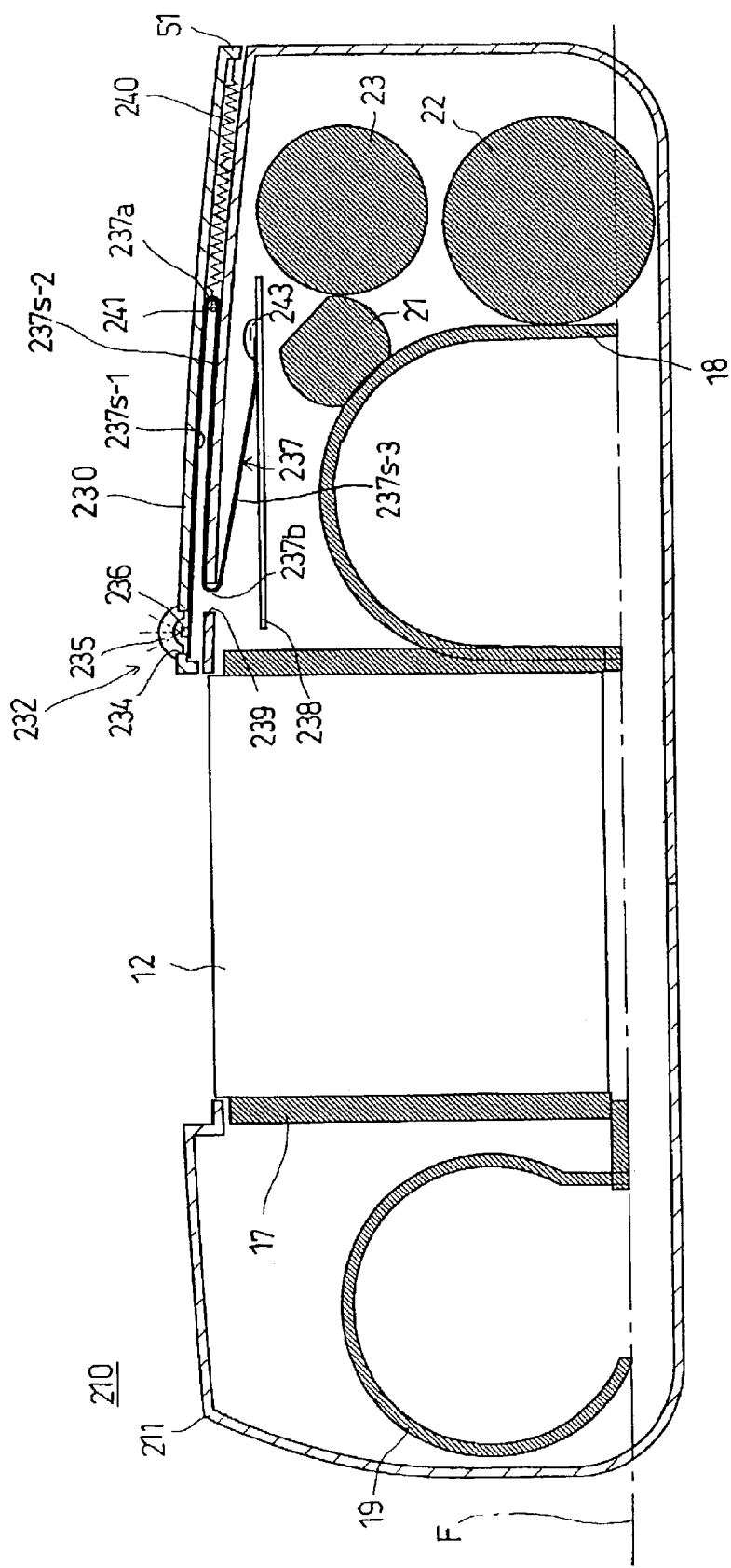
FIG. 8 is a cross sectional view of a third embodiment of the camera according to the present invention, illustrating the camera in a state where the lens cover plate is fully opened.
Figure 9:
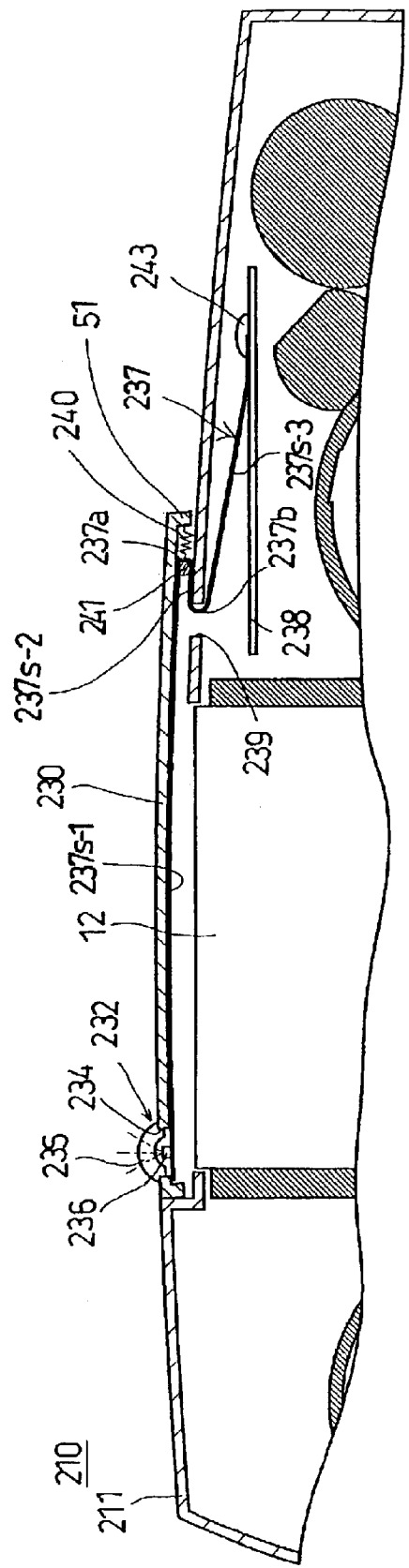
FIG. 9 is a cross sectional view, with portions cut away for clarity, of the camera shown in FIG. 8, and illustrates the camera in a state where the lens cover plate is fully closed.

FIGS. 8 and 9 show the third embodiment of a camera 210 according to the present invention. The camera 210 is provided with a lens cover plate 230 and a light-emitting indicator 232 which correspond to the lens cover plate 30 and the light-emitting indicator 32 of the first embodiment of the camera 10, respectively. The fixing position of the light-emitting indicator 232 (a through-hole 234, a transparent covering member 235 and an LED 236) on the lens cover plate 230 is substantially the same as the light-emitting indicator 32 of the first embodiment of the camera 10; however, the wiring arrangement of a flexible PWB 237, which corresponds to the flexible PWB 37 of the first embodiment of the camera 10, is different from the wiring arrangement of the flexible PWB 37 of the first embodiment of the camera 10.

The flexible PWB 237 is provided with two U-shaped portions, i.e., front and rear U-shaped portions 237a and 237b, and three straight portions 237s-1, 237s-2 and 237s-3. A front wall of a camera body 211 of the camera 210 is provided in the vicinity of the lens barrel 12 with a body through-hole 239 through which the flexible PWB 237 is drawn into the camera body 211 from front of the camera body 211. The body through-hole 239 is formed on the portion of the front wall of the camera body 211 which remains covered by the lens cover plate 230 regardless of whether the lens cover plate 230 is in the fully-closed position or the fully-open position. The rear U-shaped portion 237b is positioned in the body through-hole 239, similar to the front U-shaped portion 137b of the second embodiment of the camera 110. The first straight portion 237s-1 extends along an inner surface of the lens cover plate 230 between the light-emitting indicator 232 and the front U-shaped portion 237a. The second straight portion 237s-2 extends along an outer surface of a front wall of the camera body 211 between the front U-shaped portion 237a and the rear U-shaped portion 237b. Namely, the first and second straight portions 237s-1 and 237s-2, and the front U-shaped portion 237a between the first and second straight portions 237s-1 and 237s-2 is positioned not in the camera body 211, but in a space between the lens cover plate 230 and a front wall of the camera body 211. An extension coil spring (biasing device) 240 for removing slack in the flexible PWB 237 is positioned in the space between the lens cover plate 230 and a front wall of the camera body 211. One end (right end as viewed in FIG. 8) of the extension coil spring 240 is fixed to an end wall 51 of the lens lens-cover plate 230 while the other end of the extension coil spring 240 is fixed to a roller 241 around which the front U-shaped portion 237a is wound so that the extension coil spring 240 pulls the front U-shaped portion 237a in a rightward direction as viewed in each of FIGS. 8 and 9 (in a direction away from the LED 236).

According to the wiring arrangement of the flexible PWB 237, when the lens cover plate 230 is opened and closed, the length of the third straight portion 237s-3 of the flexible PWB 237 which extends between the rear U-shaped portion 237b and a soldered portion 243 fixed onto a lighting-control circuit board (light-source controller) 238 does not change substantially while the relative length changes between the first straight portion 237s-1 and the second straight portion 237s-2. The flexible PWB 237 is always under a tension of the extension coil spring 240 to prevent slack in the flexible PWB 237 from occurring. The extension coil spring 240 expands most when the lens cover plate 230 is in the fully-open position as shown in FIG. 8, and contracts most when the lens cover plate 230 is in the fully-closed position as shown in FIG. 9.

FIGS. 10 through 14 show the fourth embodiment of the camera according to the present invention. Unlike each of the above described first through third embodiments of the cameras 10, 110 and 210, a lens cover plate 330 of the fourth embodiment of the camera 310 is supported by a camera body 311 therein along an inner surface of a front wall of the camera body 311, not along an outer surface of a front wall of the camera body. As shown in FIGS. 10 through 12, the camera body 311 is provided on a front wall thereof with a closable opening 50 which is opened and closed by the lens cover plate 330 when the camera is in use and not in use, respectively. The camera body 331 is provided, on upper and lower portions thereof immediately behind a front wall of the camera body 331 (in the camera body 331 behind the closable opening 50), with a pair of guide recesses 324, respectively, which extend parallel to each other in the horizontal direction (right and left direction) of the camera body 310. Upper and lower edges 52 and 53 of the lens cover plate 330 are engaged in the pair of guide recesses 324, respectively. Accordingly, the lens cover plate 330 is supported by the camera body 311 so as to be slidable thereon in the horizontal direction of the camera body 311 by engagement of the pair of guide recesses 324 with the upper and lower edges 52 and 53.

The lens cover plate 330 is provided in the vicinity of an inner edge (a right edge as viewed in each of FIGS. 10 and 11) thereof with a light-emitting indicator 332 which indicates specific information on the camera 310 by light emission. The light-emitting indicator 332 is provided with an LED 336 and a transparent covering member 335 positioned in front of the LED 336. The lens cover plate 330 is provided with a through opening in which the transparent covering member 335 is fitted so that it does not project forward from the through opening. The LED 336 is positioned in the through-hole behind the transparent covering member 335. The LED 336 is electrically connected to a lighting-control circuit board 338 (which corresponds to the lighting-control circuit board 38 of the first embodiment) at a soldered portion 343 via the flexible PWB 337. The flexible PWB 337 includes a front straight portion 337fs extending along an inner surface of the lens cover plate 330, a rear straight portion 337rs extending along a front surface of the lighting-control circuit board 338, and a U-shaped portion 337a which connects the front straight portion 337fs and the rear straight portion 337rs. The U-shaped portion 337a is normally pulled in a direction away from the center of the camera 110, i.e., away from the lens barrel 12 (in a rightward direction as viewed in each of FIGS. 13 and 14) via an extension coil spring 340 and a roller 341 to thereby prevent slack in the flexible PWB 337 from occurring whether the lens cover plate 330 is in the fully-closed position or the fully-open position. Since the lens cover plate 330 is positioned inside the camera body 311, a through-hole corresponding to the body through-hole 39 in the first embodiment of the camera 10 or the body through-hole 239 in the third embodiment of the camera 210, through which the flexible PWB is drawn into the camera body, is not formed on the camera body 311.

Figure 13:
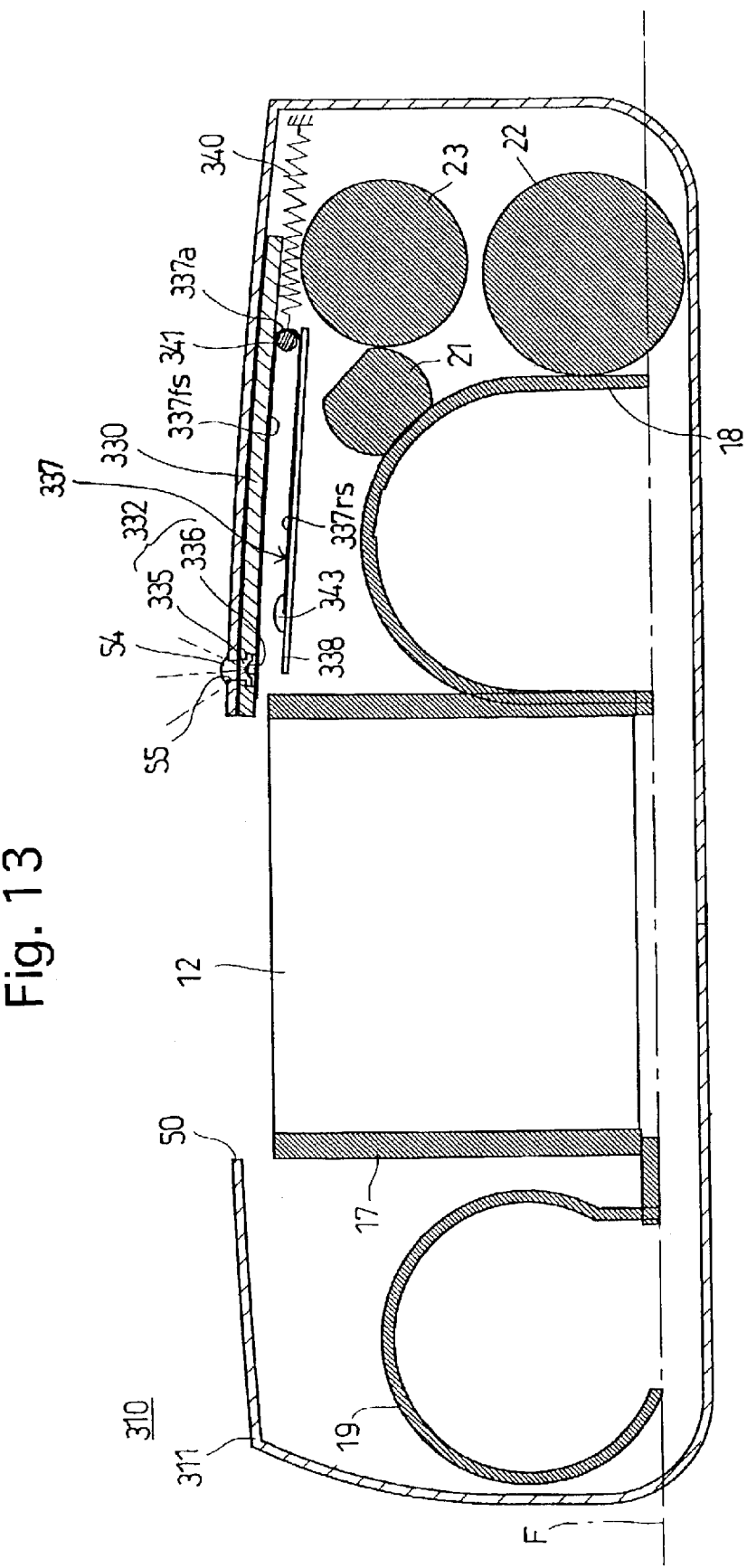
FIG. 13 is a cross sectional view taken along XIII—XIII line in FIG. 10.
Figure 14:
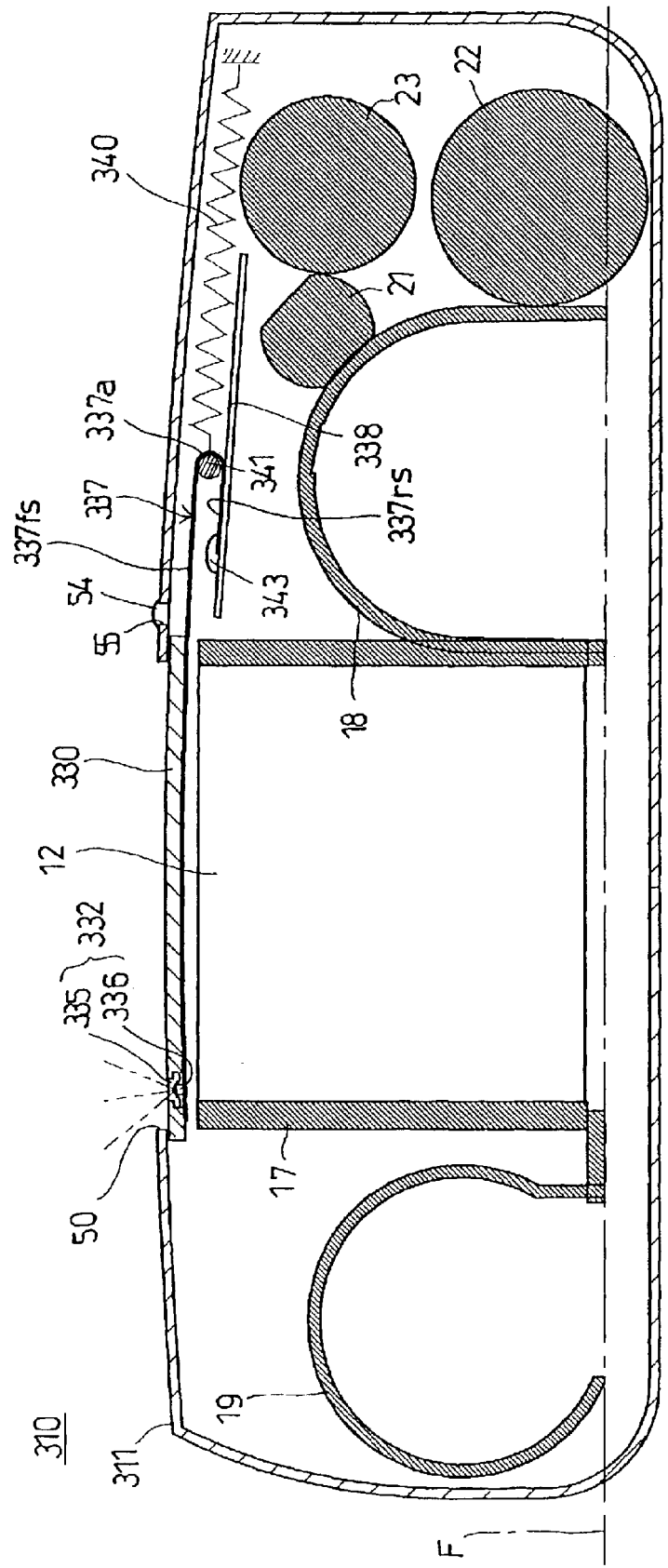
FIG. 14 is a cross sectional view taken along XIV—XIV line in FIG. 11.

When the lens cover plate 330 is in the fully-closed position as shown in FIG. 14, the light emitted from the LED 336 can be projected toward the front of the camera 310 through the transparent covering member 335, that is formed to serve as a diffusing lens at a light emission of the LED 336, since the light-emitting indicator 332 is exposed to the front of the camera 310 through the closable opening 50. On the other hand, when the lens cover plate 330 is in the fully-open position as shown in FIG. 13, the light-emitting indicator 332 is positioned inside the camera body 311. The camera body 311 is provided on a front wall thereof with a through-hole 55 at a position facing the transparent covering member 335 in a state where the lens cover plate 330 is in the fully-open position. A transparent member 54 is fitted in the through-hole 55. Accordingly, even if the lens cover plate 330 is in the fully-open position, the light emitted from the LED 336 can be projected toward the front of the camera 310 through the two transparent covering members 54 and 335.

Figure 15:
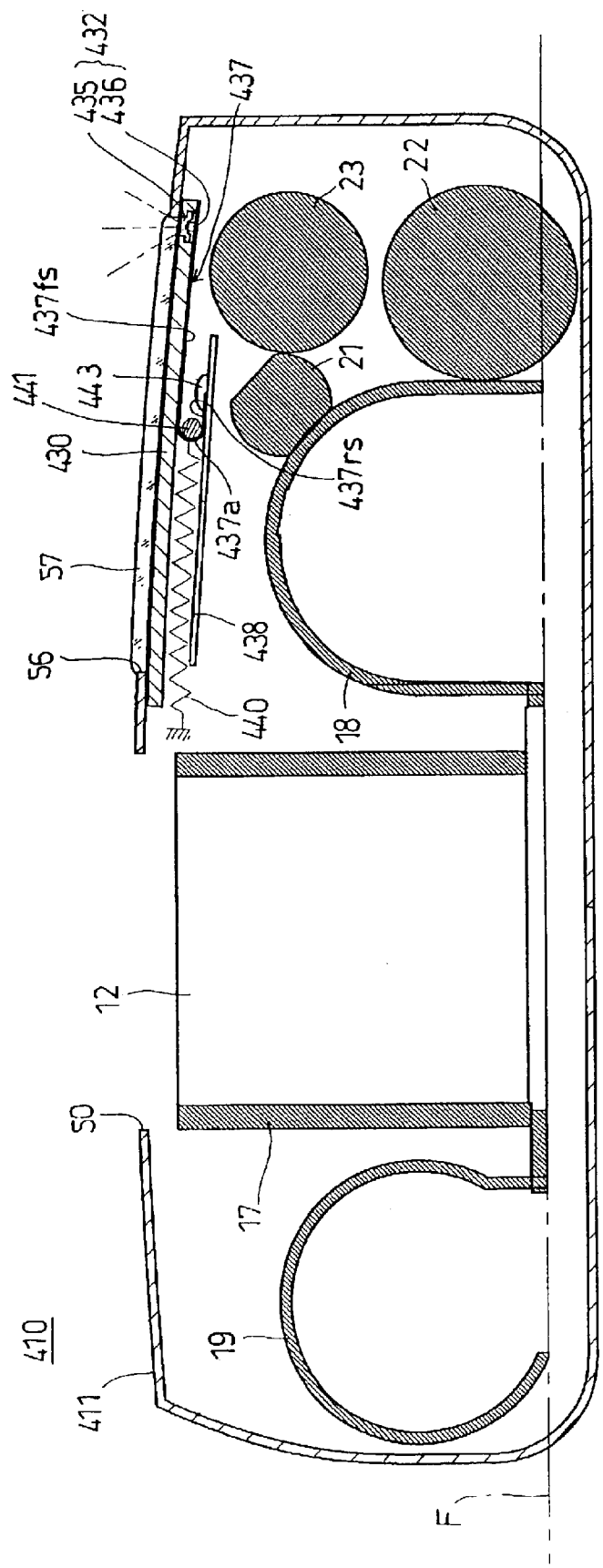
FIG. 15 is a cross sectional view of a fifth embodiment of the camera according to the present invention, illustrating the camera in a state where the lens cover plate is fully opened.
Figure 16:
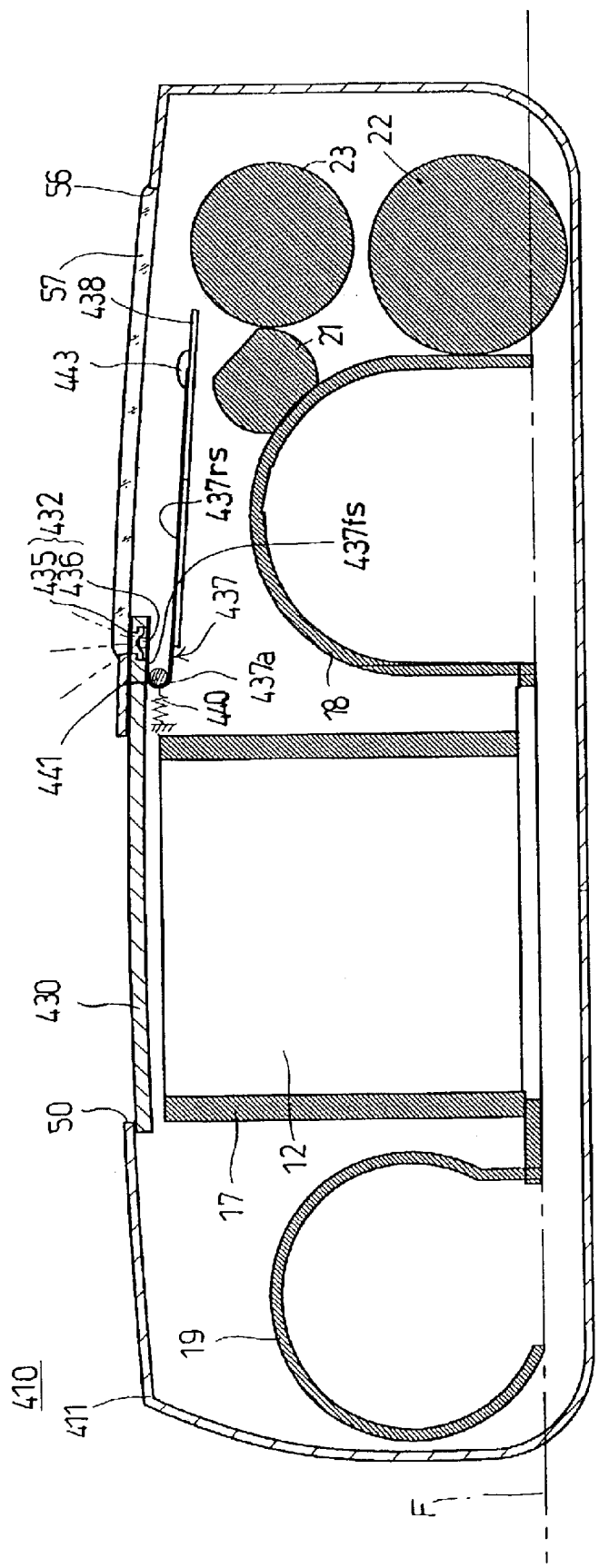
FIG. 16 is a view similar to that of FIG. 15 and illustrates the camera in a state where the lens cover plate is fully closed.

FIGS. 15 and 16 show the fifth embodiment of the camera according to the present invention. Similar to the fourth embodiment of the camera 310, a lens cover plate 430 of the fifth embodiment of the camera 410 is supported by a camera body 411 therein along an inner surface of a front wall of the camera body 411, and is manually moved behind the closable opening 50 to open and close the closable opening 50. A transparent member 435 and an LED 436 which are positioned in a through-hole formed on the lens cover plate 430 constitute a light-emitting indicator 432. The LED 436 is electrically connected to a lighting-control circuit board 438 (which corresponds to the lighting-control circuit board 38 of the first embodiment) at a soldered portion 443 thereon via a flexible PWB 437. The flexible PWB 437 includes a front straight portion 437*fs* extending along an inner surface of the lens cover plate 430, a rear straight portion 437*rs* extending along a front surface of the lighting-control circuit board 438, and a U-shaped portion 437*a* which connects the front straight portion 437*fs* and the rear straight portion 437*rs* of the flexible PWB 437. The U-shaped portion 437*a* is normally pulled in a direction toward the center of the camera 410, i.e., toward the lens barrel 12 (in a leftward direction as viewed in each of FIGS. 15 and 16) via an extension coil spring 440 and a roller 441 to thereby prevent slack in the flexible PWB 437 from occurring whether the lens cover plate 430 is in the fully-closed position or the fully-open position.

The light-emitting indicator 432 remains positioned inside the camera body 411 whether the lens cover plate 430 is in the fully-open position as shown in FIG. 15 or the fully-closed position as shown in FIG. 16. Namely, the light-emitting indicator 432 is not exposed to the front of the camera in all cases. The camera body 411 is provided on a front wall thereof with a horizontally elongated body through-hole 56 which ranges to correspond to the range of movement of the light-emitting indicator 432. An elongated transparent member 57, which is provided as a member separate from the transparent member 435, is fitted in the body through-hole 56. Accordingly, a state of light emission of the LED 436 can be seen through the transparent members 435 and 57.

Although the body through-hole 56 and the elongated transparent member (transparent portion) 57 range to correspond to the range of movement of the light-emitting indicator 432 on the lens cover plate 430 in the above described embodiment, such a transparent portion formed on the camera body 411 can be formed only at each of two positions on a front wall of the camera body 411: a first position facing the light-emitting indicator 432 when the lens cover plate 430 is in the fully-closed position (FIG. 16) and a second position facing the light-emitting indicator 432 when the lens cover plate 430 is in the fully-open position (FIG. 15). In this case, an intermediate portion on the front wall of the camera body 411 between the first and second positions is formed as an opaque (non-transparent) portion.

Figure 17:
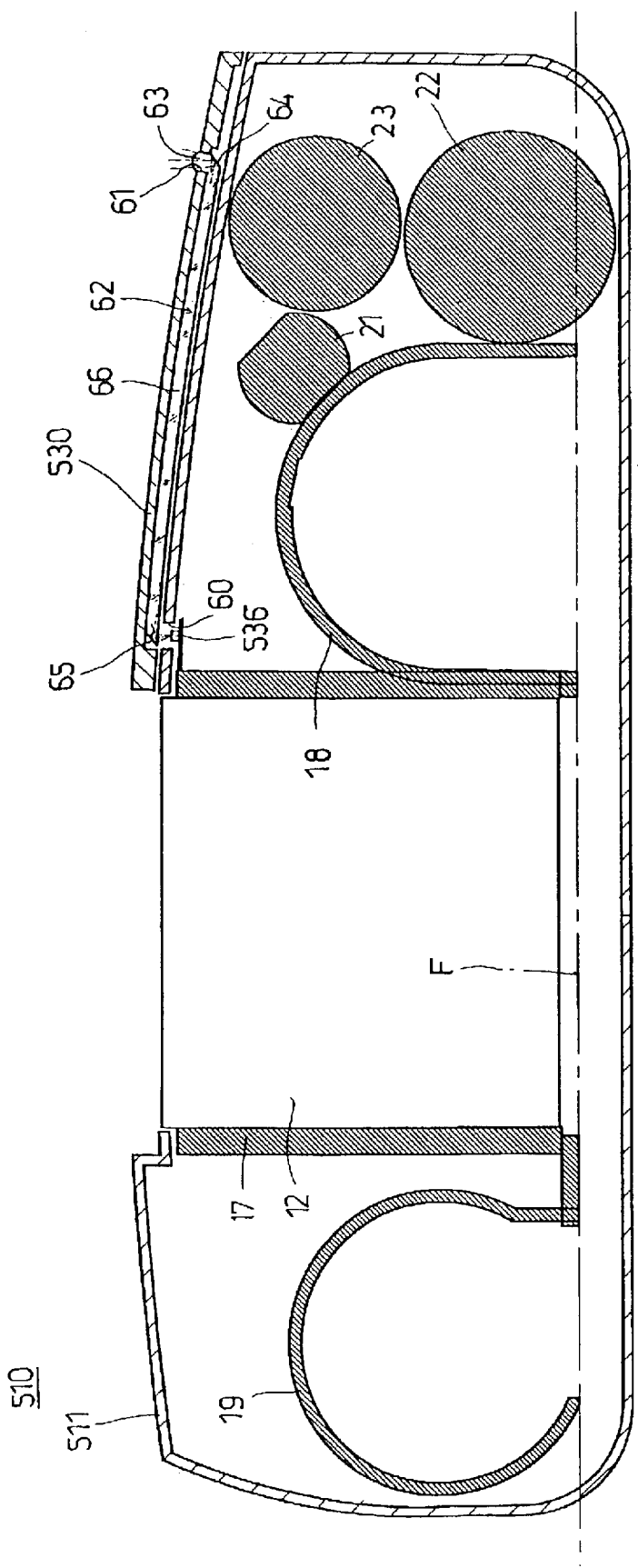
FIG. 17 is a cross sectional view of a sixth embodiment of the camera according to the present invention, illustrating the camera in a state where the lens cover plate is fully opened.
Figure 18:
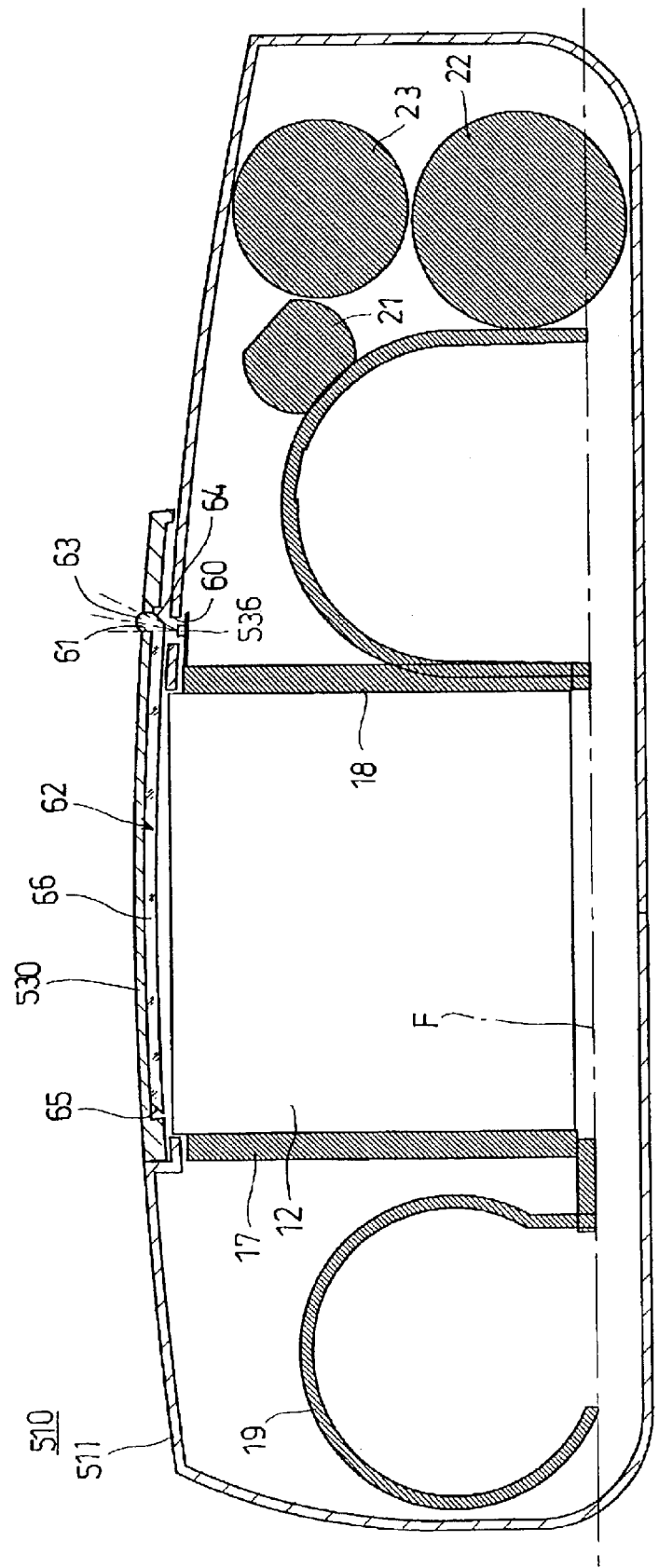
FIG. 18 is a view similar to that of FIG. 17 and illustrates the camera in a state where the lens cover plate is fully closed.

FIGS. 17 and 18 show the sixth embodiment of the camera according to the present invention. This camera 510 is different from each of the above described first through fifth embodiments of the cameras in that an LED 536 of a light-emitting device is fixed to a camera body 511 in the sixth embodiment of the camera 510, whereas a light source (LED) of a light emitting device is fixed to a movable lens cover plate in each of the above described first through fifth embodiments of the cameras. The LED 536 is positioned in a body through-hole 60 formed on the camera body 511, and therefore does not move by movement of a lens cover plate 530. Due to this structure, the camera 510 is not provided with any flexible PWB for the LED 536 or any mechanism for removing slack in flexible PWB.

The LED 536 positioned in the body through-hole 60 remains covered by the lens cover plate 530 regardless of whether the lens cover plate 530 is in the fully-open position as shown in FIG. 17 or the fully-closed position as shown in FIG. 18. Accordingly, the body through-hole 60 is never exposed to the front of the camera 510. The lens cover plate 530 is provided with a through-hole 61 which faces the body through-hole 60 when the lens cover plate 530 is in the fully-closed position. A transparent light guide member 62 is fixed to a rear surface of the lens cover plate 530 so that a light exit portion 63 formed at one end (right end as viewed in each of FIGS. 17 and 18) of the light guide member 62 is fitted in the through-hole 61. The light guide member 62 is provided in the vicinity of the light exit portion 63 with a reflecting surface 64. The light guide member 62 is provided at the other end (left end as viewed in each of FIGS. 17 and 18) thereof with a reflecting surface 65. The light guide member 62 is provided between the two reflecting surfaces 64 and 65 with an elongated light guide portion 66 which extends linearly along an inner surface of the lens cover plate 530.

In a state where the lens cover plate 530 is in the fully-closed position as shown in FIG. 18, a state of light emission of the LED 536 can be seen through the light exit portion 63 when the LED 536 emits light, since the light exit portion 63 of the light guide member 62 is positioned in front of the LED 536. On the other hand, in a state where the lens cover plate 530 is in the fully-open position as shown in FIG. 17, a state of light emission of the LED 536 can be seen via the reflecting surface 65, the elongated light guide portion 66, the reflecting surface 64 and the light exit portion 63 when the LED 536 emits light, since the reflecting surface 65 is positioned in front of the LED 536. Specifically, in a state where the lens cover plate 530 is in the fully-open position as shown in FIG. 17, light emitted from the LED 536 is reflected by the reflecting surface 65 to travel in a direction toward the reflecting surface 64 through the elongated light guide portion 66, and is subsequently reflected by the reflecting surface 64 to exit forward from the light exit portion 63. Accordingly, light emitted from the LED 536 can be guided to the front of the lens cover plate 530 via the light guide member 62 in either of the fully-opened position and the fully-closed position of the lens cover plate 530.

Figure 19:
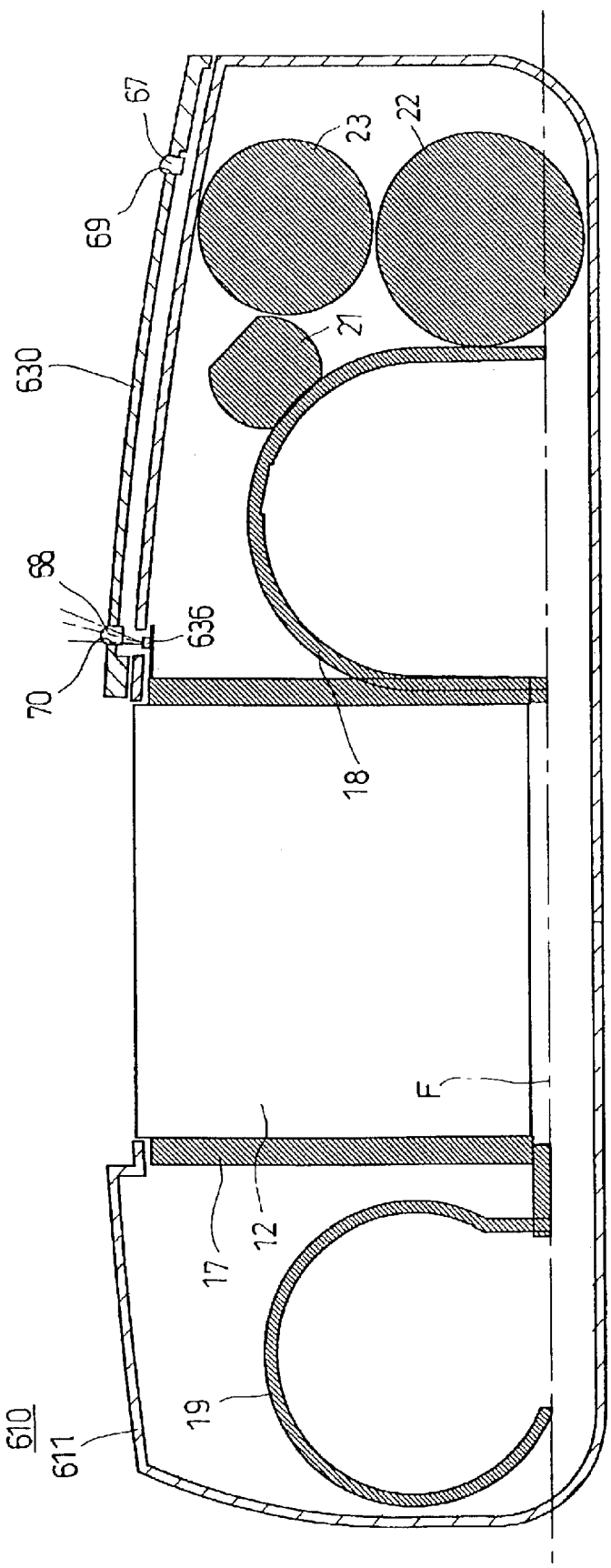
FIG. 19 is a cross sectional view of a seventh embodiment of the camera according to the present invention, illustrating the camera in a state where the lens cover plate is fully opened.

FIGS. 19 and 20 show the seventh embodiment of a camera 610 according to the present invention. The camera 610 is the same as the sixth embodiment of the camera 510 in regard to an LED 636 being provided as an element fixed to the camera body 611. The seventh embodiment of the camera 610 is substantially the same as the sixth embodiment of the camera 510 except that the camera 610 is provided on a lens cover plate 630 with two transparent members 67 and 68 instead of the single light guide member 62 shown in FIGS. 17 and 18. Similar to the light exit portion 63 of the sixth embodiment of the camera 510, the transparent member 67 is fitted in a through-hole 69 which is formed on the lens cover plate 630 at a position thereon which faces the LED 636 when the lens cover plate 630 is in the fully-closed position as shown in FIG. 20. Accordingly, when the lens cover plate 630 is in the fully-closed position as shown in FIG. 20, light emitted from the LED 636 is projected toward the front of the camera 610 via the transparent member 67 when the LED 636 emits light. The other transparent member 68 is fitted in another through-hole 70 which is formed on the lens cover plate 630 at a position thereon which faces the LED 636 when the lens cover plate 630 is in the fully-open position as shown in FIG. 19. Accordingly, when the lens cover plate 630 is in the fully-open position as shown in FIG. 19, light emitted from the LED 636 is projected toward the front of the camera 610 via the transparent member 68 when the LED 636 emits light.

As can be understood from the above description, according to each of the above described first through seventh embodiments of the cameras having an openable wide lens-cover plate, a high degree of design freedom in the manner of indication of information by the light-emitting indicator (in location and shape of the light-emitting indicator) is achieved. This makes it possible to achieve a camera having an openable lens cover plate which is excellent in design and usability.

The present invention is not limited solely to each of the above described particular embodiments. For instance, the transparent covering member 35 of the light-emitting indicator 32 shown in FIGS. 1 and 2, which is provided on front of the lens cover plate 30, is in the shape of a vertically elongated ellipse, but can be in any other shape. In addition, although the strobe window 16 is not covered by the lens cover plate 30 when it is in the fully-closed position in the first embodiment of the camera shown in FIGS. 1 and 2, the strobe window 16 and/or any other functional portions on the camera body can be covered by the lens cover plate 30 when in the fully-closed position.

A construction can also be provided in the camera wherein the main power of the camera is turned ON and OFF when the lens cover plate 30 is positioned in the open position and closed position, respectively.

As can be understood from the above description, a camera having an openable wide lens cover plate which has a high degree of design freedom in location and shape of the light-emitting indicator is achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera comprising:

a camera body having a photographing lens;

a lens cover plate which is supported on said camera body so that said lens cover plate moves between a closed position at which said lens cover plate covers the front of said photographing lens and an open position at which said lens cover plate uncovers said front of said photographing lens, wherein said lens cover plate does not extend beyond the perimeter of a surface of said camera body containing the photographing lens when said lens cover plate is in either position; and a light emitting device, at least one element of said light emitting device being positioned on said lens cover plate.

2. The camera according to claim 1, wherein said light emitting device serves as an indicator for indicating information on said camera by light emission.

3. The camera according to claim 1, wherein said light emitting device comprises:

a light source positioned in a through-hole formed on said lens cover plate; and a transparent member positioned in front of said light source.

4. The camera according to claim 3, wherein said light emitting device further comprises:

a light-source controller, provided in said camera body, for controlling light emission of said light source; and a flexible printed wiring board which connects said light source with said light-source controller, and is flexed by a movement of said light source when said lens cover plate moves between said closed position and said open position.

5. The camera according to claim 4, wherein said flexible printed wiring board comprises:

two straight portions extending substantially parallel to a direction of movement of said lens cover plate; and a U-shaped portion which connects said two straight portions, and wherein said camera further comprises a biasing device which pulls said U-shaped portion in a direction parallel to a direction of movement of said lens cover plate to remove slack in said flexible printed wiring board.

6. The camera according to claim 5, wherein said U-shaped portion is positioned inside said camera body.

7. The camera according to claim 5, wherein said lens cover plate is supported by said camera body to be positioned outside thereof, and wherein said U-shaped portion is positioned in a space between said lens cover plate and said camera body.

8. The camera according to claim 4, wherein said lens cover plate is supported by said camera body to be positioned outside thereof;

wherein a front wall of said camera body is provided with a through-hole via which said flexible printed wiring board is drawn into said camera body from outside said camera body; and wherein said through-hole is formed on a portion of said camera body which remains covered by said lens cover plate when said lens cover plate is in said closed position and when said lens cover plate is in said open position.

9. The camera according to claim 5, wherein said lens cover plate is supported by said camera body to be positioned outside thereof;

wherein a front wall of said camera body is provided with a through-hole via which said flexible printed wiring board is drawn into said camera body from outside said camera body;

wherein said through-hole is formed on a portion of said camera body which remains covered by said lens cover plate when said lens cover plate is in said closed position and when said lens cover plate is in said open position; and wherein said flexible printed wiring board further comprises:

a third straight portion extending substantially parallel to said two straight portions, said third straight portion being positioned on an opposite side of said front wall of said camera body with respect to said two straight portions; and a second U-shaped portion which connects said third straight portion with one of said two straight portions, said second U-shaped portion being positioned in said through-hole.

10. The camera according to claim 3, wherein said lens cover plate is supported by said camera body to be positioned inside said camera body;

wherein said light source and said transparent member, which is positioned in front of said light source, are fixed to said lens cover plate;

wherein said transparent member is covered by said camera body when said lens cover plate is positioned in at least one of said open position and said closed position; and wherein said camera body comprises a transparent portion which is positioned in front of said transparent member when said lens cover plate is positioned in at least one of said open position and said closed position.

11. The camera according to claim 10, wherein said transparent member, which is fixed to said lens cover plate, is covered by said camera body when said lens cover plate is positioned in said open position, and wherein said transparent portion of said camera body comprises a through-hole formed at a position on said camera body which faces said transparent member when said lens cover plate is in said open position, and wherein a second transparent member is fitted in said through-hole.

12. The camera according to claim 10, wherein said transparent member, which is fixed to said lens cover plate, remains covered by said camera body when said lens cover plate is positioned in one of said open position and said closed position;

wherein said transparent portion of said camera body comprises a through-hole which is sized to correspond to a range of movement of said transparent member, and a second transparent member is fitted in said through-hole.

13. The camera according to claim 1, wherein said lens cover plate is supported on said camera body and positioned on the outside thereof; and wherein said light emitting device comprises:

a light source formed at a position on said camera body which is covered by said lens cover plate when said lens cover plate is positioned in at least one of said open position and said closed position; and a transparent portion formed on said lens cover plate to allow light emitted from said light source to pass through said transparent portion.

14. The camera according to claim 13, wherein said light source is formed on a portion of said camera body which remains covered by said lens cover plate when said lens cover plate is in said closed position and when said lens cover plate is in said open position, and wherein said transparent portion of said lens cover plate allows said light emitted from said light source to pass through said transparent portion when said lens cover plate is positioned in one of said open position and said closed position.

15. The camera according to claim 13, wherein said transparent portion of said lens cover plate comprises:

a through-hole formed on said lens cover plate to be positioned in front of said light source when said lens cover plate is positioned in one of said open position and said closed position; and a light guide which includes a light exit portion fitted in said through-hole and a light guide portion, said light guide guiding light emitted from said light source to said light exit portion via said light guide portion when said lens cover plate is positioned in the other of said open position and said closed position.

16. The camera according to claim 13, wherein said transparent portion of said lens cover plate comprises:

two through-holes formed on said lens cover plate, said two through-holes being positioned in front of said light source when said lens cover plate is positioned in said open position and said closed position, respectively; and two transparent members fitted in said two through-holes, respectively.

17. The camera according to claim 5, wherein said biasing device comprises an extension coil spring extending between said U-shaped portion and a stationary portion of said camera body.

18. The camera according to claim 1, wherein a main power of said camera is turned ON and OFF when said lens cover plate is positioned in said open position and said closed position, respectively.

19. The camera according to claim 3, wherein said transparent member is fixed to said lens cover plate to project forward from a front surface of said lens cover plate so as to serve as a fingerhold.

20. The camera according to claim 3, wherein said transparent member is fixed to said lens cover plate to serve as a diffusing lens.

21. A camera comprising:

a camera body having a photographing lens;

a lens cover plate which is supported on said camera body so that said lens cover plate moves between a closed position at which said lens cover plate covers the front of said photographing lens and an open position at which said lens cover plate uncovers said front of said photographing lens, wherein said lens cover plate does not extend beyond the perimeter of a surface of said camera body containing the photographing lens when said lens cover plate is in either position; and a light-emitting indicator including a light source and a transparent member positioned in front of said light source, said light emitting indicator being fixed to said lens cover plate.

22. A camera comprising:

a camera body having a photographing lens;

a lens cover plate which is supported on said camera body so that said lens cover plate moves between a closed position at which said lens cover plate covers the front of said photographing lens and an open position at which said lens cover plate uncovers said front of said photographing lens;

a light source formed at a position on said camera body which is covered by said lens cover plate when said lens cover plate is positioned in at least one of said open position and said closed position; and a transparent portion formed on said lens cover plate to allow light emitted from said light source to pass through said transparent portion.

23. A camera comprising:

a camera body having a photographing lens;

a lens cover plate which is supported on said camera body so that said lens cover plate moves between a closed position at which said lens cover plate is positioned in front of said photographing lens and an open position at which said lens cover plate is positioned aside from front of said photographing lens, wherein said lens cover plate does not extend beyond the perimeter of a surface of said camera body containing the photographing lens when said lens cover plate is in either position; and a light emitter;

wherein said lens cover plate comprises a transparent portion through which said light emitter emits light toward a front of said camera.

* * * * *